(12) United States Patent
Frassica et al.

(10) Patent No.: US 7,854,612 B2
(45) Date of Patent: Dec. 21, 2010

(54) ANATOMICAL MODEL

(75) Inventors: James J. Frassica, Chelmsford, MA (US); Robert E. Ailinger, Norwood, MA (US)

(73) Assignee: Spirus Medical, Inc., Stoughton, MA (US)

( * ) Notice: Subject to any disclaimer, the term of this patent is extended or adjusted under 35 U.S.C. 154(b) by 792 days.

(21) Appl. No.: 11/804,873

(22) Filed: May 21, 2007

(65) Prior Publication Data

US 2008/0090218 A1 Apr. 17, 2008

Related U.S. Application Data

(60) Provisional application No. 60/801,719, filed on May 19, 2006.

(51) Int. Cl.
*G09B 23/28* (2006.01)
(52) U.S. Cl. ........................ 434/272; 434/267
(58) Field of Classification Search .............. 434/262, 434/267, 268, 272, 295, 296
See application file for complete search history.

(56) References Cited

U.S. PATENT DOCUMENTS

| | | | | |
|---|---|---|---|---|
| 5,320,537 A * | 6/1994 | Watson | ................ | 434/272 |
| 6,062,866 A * | 5/2000 | Prom | ................ | 434/268 |
| 6,511,325 B1 * | 1/2003 | Lalka et al. | ................ | 434/272 |
| 6,543,657 B2 * | 4/2003 | Fan et al. | ................ | 223/66 |
| 6,773,263 B2 * | 8/2004 | Nicholls et al. | ................ | 434/267 |
| 6,997,719 B2 * | 2/2006 | Wellman et al. | ................ | 434/272 |
| 7,008,232 B2 * | 3/2006 | Brassel | ................ | 434/268 |
| 7,059,168 B2 * | 6/2006 | Hibi et al. | ................ | 73/1.86 |
| 2001/0019818 A1 * | 9/2001 | Yong | ................ | 434/262 |
| 2005/0074732 A1 * | 4/2005 | Morris | ................ | 434/268 |
| 2007/0020598 A1 * | 1/2007 | Yamashita et al. | ................ | 434/267 |
| 2008/0076101 A1 * | 3/2008 | Hyde et al. | ................ | 434/272 |
| 2008/0187895 A1 * | 8/2008 | Sakezles | ................ | 434/268 |

* cited by examiner

*Primary Examiner*—Kurt Fernstrom
(74) *Attorney, Agent, or Firm*—Pandiscio & Pandiscio

(57) ABSTRACT

An anatomical model comprising:
 an inner lumen; and
 an outer lumen, wherein the inner lumen is disposed inside of the outer lumen so as to create a space therebetween;
 and further wherein a fluid is disposed within the space, interior to the outer lumen and exterior to the inner lumen, whereby the inner lumen can accurately simulate the mucous membrane lining a mammalian tract.

14 Claims, 1 Drawing Sheet

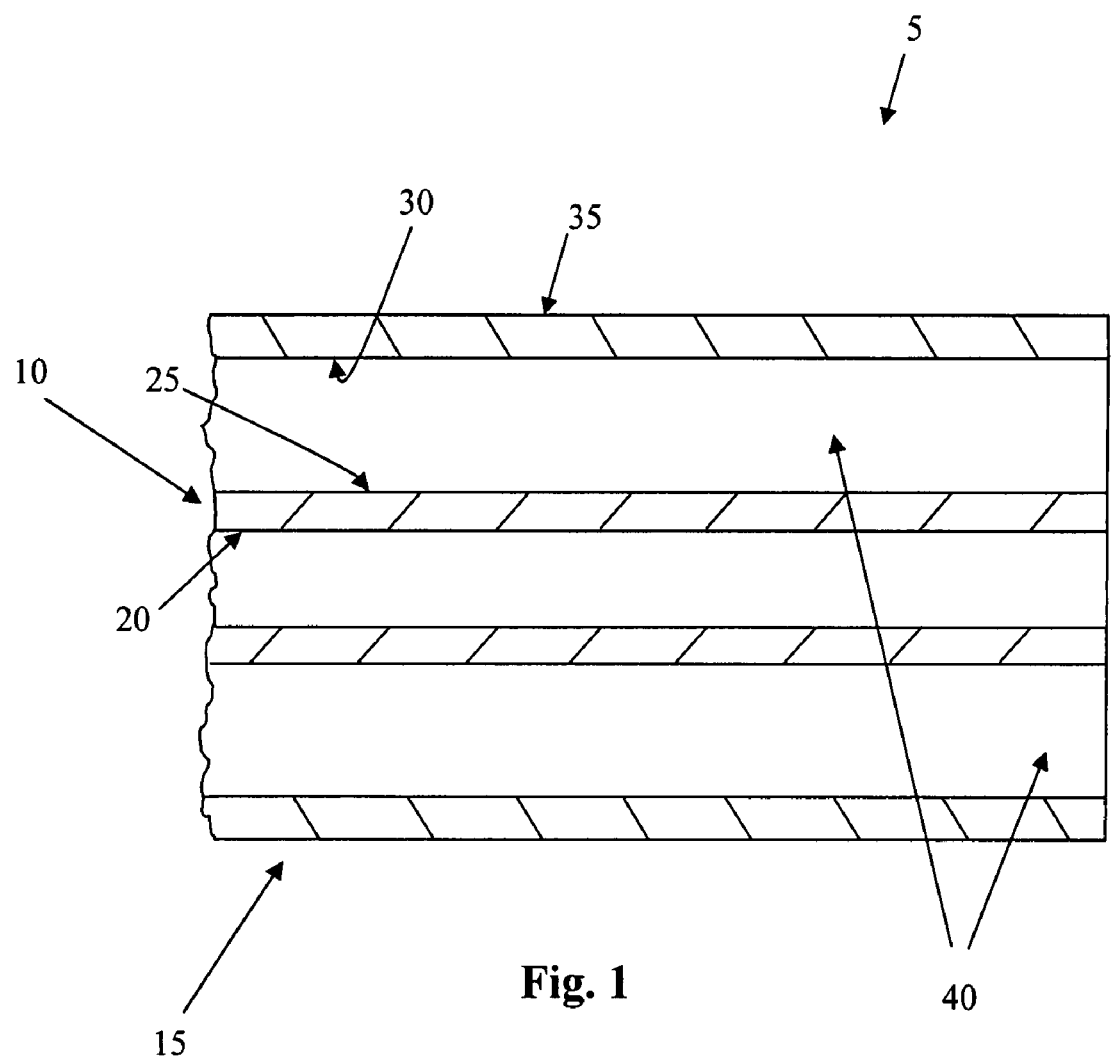

ANATOMICAL MODEL

REFERENCE TO PENDING PRIOR PATENT APPLICATION

This patent application claims benefit of prior U.S. Provisional Patent Application Ser. No. 60/801,719, filed May 19, 2006 by James Frassica et al. for ANATOMICAL MODEL.

The above-identified patent application is hereby incorporated herein by reference.

FIELD OF THE INVENTION

This invention relates to anatomical models in general, and more particularly to anatomical models of a mammalian tract for use in teaching endoscopic insertion techniques and therapeutic procedures to physicians and other medical personnel.

BACKGROUND OF THE INVENTION

In most mammals, mucous membranes line the passages by which internal organs communicate with the exterior environment. By way of example but not limitation, the two primary mammalian tracts (i.e., the gastrointestinal and genitourinary tracts) are lined with mucous membranes. These mucous membranes are generally soft and velvety, and very vascular, and their surfaces are coated over by their mucous secretion, which is typically of a viscous consistency. The mucous serves to protect tissue from foreign substances which may be introduced into the body.

In order to provide a training tool for physicians and other medical personnel who are learning endoscopic insertion techniques and therapeutic procedures, it has been found desirable to provide a clinically realistic anatomical model of the mucous membranes which line the two primary mammalian tracts, i.e., the gastrointestinal and genitourinary tracts.

Many, if not most, of the prior art anatomical models of the gastrointestinal and genitourinary tracts are singled-walled tubular models which are positioned on a base plate. These single-walled tubular models generally utilize elastomeric materials such as silicone or a thermoplastic elastomer (TPE) to simulate the pliable, compliant nature of a gastrointestinal and/or genitourinary tract organ, e.g., the bowel, etc.

However, there are many deficiencies associated with these prior art anatomical models.

For example, elastomeric materials tend to have a high coefficient of friction, which is the opposite of the slippery mucous-lined anatomy of the gastrointestinal and genitourinary tracts. Thus, forming the anatomical model out of an elastomer makes it difficult to pass the instrumentation (e.g., an endoscope) through the anatomical model in a natural manner. One solution to this problem is to add a lubricant to the anatomical model and/or the instrumentation. However, this approach is not completely satisfactory, since the lubricant can dry out, even in a relatively short time period, which can then make it even more difficult to pass instrumentation through the model.

Another significant deficiency of prior art anatomical models is that these models fail to realistically incorporate the external compression (e.g., abdominal pressure from adjacent organs) which acts on the gastrointestinal and/or genitourinary tract. For example, the bowel and the urethra are both tubular organs which typically lay in a flat condition when these organs are not distended. Prior art anatomical models are generally constructed with self-supporting walls which do not simulate the lay-flat anatomy which is being compressed by abdominal pressure from adjacent organs.

For these reasons, and others, there is presently a need for a more realistic and accurate anatomical model which can be used as a training tool for physicians and other medical personnel to learn endoscopic insertion techniques and therapeutic procedures.

SUMMARY OF THE INVENTION

It is, therefore, an object of the present invention to provide an accurate and realistic anatomical model which can be used by physicians and other medical personnel to learn endoscopic insertion techniques and therapeutic procedures.

This and other objects are addressed by the provision and use of the present invention, which generally comprises an anatomical model comprising an inner lumen and an outer lumen, wherein the inner lumen is disposed inside of the outer lumen so as to create a space therebetween, and further wherein a fluid is disposed within the space, interior to the outer lumen and exterior to the inner lumen, whereby the inner lumen can accurately simulate the mucous membrane lining a mammalian tract (e.g., the gastrointestinal or genitourinary tract).

In one preferred form of the invention, there is provided an anatomical model comprising:

an inner lumen; and an outer lumen, wherein the inner lumen is disposed inside of the outer lumen so as to create a space therebetween;

and further wherein a fluid is disposed within the space, interior to the outer lumen and exterior to the inner lumen, whereby the inner lumen can accurately simulate the mucous membrane lining a mammalian tract.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawing wherein like numbers refer to like elements and further wherein:

FIG. 1 is a schematic drawing showing a preferred embodiment of the present invention.

DETAILED DESCRIPTION OF THE PRESENT INVENTION

The present invention generally comprises an anatomical model comprising an inner lumen and an outer lumen, wherein the inner lumen is disposed inside of the outer lumen so as to create a space therebetween, and further wherein a fluid is disposed within the space, interior to the outer lumen and exterior to the inner lumen, whereby the inner lumen can accurately simulate the mucous membrane lining a mammalian tract (e.g., the gastrointestinal or genitourinary tract).

More particularly, and looking now at FIG. 1, there is shown an anatomical model 5 which comprises two lumens, an inner lumen 10 and an outer lumen 15, wherein inner lumen 10 is disposed inside of outer lumen 15. Inner lumen 10 generally comprises an interior surface 20 and an exterior surface 25. Outer lumen 15 generally comprises an interior surface 30 and an exterior surface 35. On account of the foregoing construction, a space 40 is formed in between exterior surface 25 of inner lumen 10 and interior surface 30 of outer lumen 15. Inner and outer lumens 10, 15 are sized so as to approximate different anatomical locations or pathology.

In order to simulate the actual force on a mammalian tract (e.g., the gastrointestinal or genitourinary tract), space 40 is filled with a fluid. This fluid creates a radially compressive force on exterior surface 25 of inner lumen 10 which simulates the forces acting on the mammalian tract within the body (e.g., the gastrointestinal or genitourinary tract within the abdomen). In this respect, it should be noted that inner lumen 10 and outer lumen 15 are sealed so as to prevent fluid communication between the inner and outer lumens.

Inner lumen 10 and outer lumen 15 are formed out of one or more materials which have physical characteristics which, when combined with the effect of a fluid filled space 40, provide properties simulating those of real tissue. These materials may have inherently low surface friction so as to approximate the coefficient of friction of natural mucosal tissue, or the materials may incorporate a lubricant so as to simulate the low friction of natural mucosal tissue. By way of example but not limitation, the material of inner lumen 10 may comprise polyethylene, and the material of outer lumen 15 may also comprise polyethylene.

In one preferred embodiment of the present invention, inner lumen 10 and/or outer lumen 15 may be constructed from a clear material so as to provide for external visualization.

As noted above, space 40 is filled with a fluid in order to simulate the actual force on a mammalian tract (e.g., the gastrointestinal or genitourinary tract). More particularly, this fluid is selected, and pressurized, so as to provide the desired compressive force on exterior surface 25 of inner lumen 10. By way of example but not limitation, this fluid may be a gas pressurized to a desired level. By way of further example but not limitation, the fluid may be a liquid chosen from a wide range of weights or viscosities so as to affect the feel of the simulator. By way of further example but not limitation, where space 40 is filled with a gas, that gas may be nitrogen pressurized to a level of 50 mm Hg, and where space 40 is filled with a liquid, the liquid may be water.

In one preferred embodiment of the present invention, outer lumen 15 may comprise a vessel which holds inner lumen 10.

And in another preferred embodiment of the present invention, mechanical support may be used to create a 2- or 3-dimensional shape to simulate a human or animal model.

And in another preferred embodiment of the present invention, inner lumen 10 and outer lumen 15 may comprise "lay-flat" tubing so that anatomical model 5 comprises a long "poly-bag".

In use, the structure shown in FIG. 1 is provided with the fluid positioned in space 40 so as to provide the desired anatomical characteristics for anatomical model 5. Then instrumentation (e.g., an endoscope) is inserted into inner lumen 10. As this occurs, inner and outer lumens 10, 15, with the fluid-filled space 40 therebetween, model the natural tissue in a more realistic manner than the prior art.

In one preferred embodiment, a lubricant may be added to aid in the insertion of the instrumentation into inner lumen 10. By way of example but not limitation, the lubricant may comprise a mixture of water and liquid detergent.

Thus, the present invention provides an anatomical model comprising an inner lumen and an outer lumen, wherein the inner lumen is disposed inside of the outer lumen so as to create a space therebetween, and further wherein a fluid is disposed within the space, interior to the outer lumen and exterior to the inner lumen, whereby the inner lumen can accurately simulate the mucous membrane lining a mammalian tract (e.g., the gastrointestinal or genitourinary tract).

Modifications

While the present invention has been described in terms of certain exemplary preferred embodiments, it will be readily understood and appreciated by those skilled in the art that it is not so limited, and that many additions, deletions and modifications may be made to the preferred embodiments discussed herein without departing from the scope of the invention.

What is claimed is:

1. An anatomical model comprising:
an inner lumen; and
an outer lumen;
wherein said inner lumen is disposed inside of said outer lumen to create a space therebetween;
and further wherein a fluid disposed within and filling the space, interior to said outer lumen and exterior to said inner lumen, and exerting a radially compressive force on an exterior surface of said inner lumen whereby said inner lumen simulates a mucous membrane lining a mammalian tract.

2. An anatomical model according to claim 1 wherein said inner lumen is formed of polyethylene.

3. An anatomical model according to claim 1 wherein said outer lumen is formed of polyethylene.

4. An anatomical model according to claim 1 wherein the fluid is a liquid.

5. An anatomical model according to claim 4 wherein the liquid is water.

6. An anatomical model according to claim 1 wherein the fluid is a gas.

7. An anatomical model according to claim 6 wherein the fluid is a pressurized gas.

8. An anatomical model according to claim 6 wherein the gas is nitrogen.

9. An anatomical model according to claim 1 wherein the mammalian tract is the human gastrointestinal tract.

10. An anatomical model according to claim 1 wherein the mammalian tract is the human genitourinary tract.

11. The anatomical model in accordance with claim 1 wherein said inner and outer lumens are not in fluid communication with each other.

12. The anatomical model in accordance with claim 11 wherein said inner and outer lumens exhibit low surface friction and in combination with said fluid provide properties simulating properties of real tissue.

13. The anatomical model in accordance with claim 1 wherein said outer lumen is of a clear material, whereby to provide for external visualization.

14. The anatomical model in accordance with claim 1 wherein said inner and outer lumens comprise "lay flat" tubing.

* * * * *